July 18, 1950 C. E. LOMAX 2,515,783

CONTROLLING CIRCUITS FOR ROTARY CONNECTOR SWITCHES

Filed July 22, 1947 2 Sheets-Sheet 1

INVENTOR.
CLARENCE E. LOMAX

BY [signature]

ATTORNEY

July 18, 1950 C. E. LOMAX 2,515,783

CONTROLLING CIRCUITS FOR ROTARY CONNECTOR SWITCHES

Filed July 22, 1947 2 Sheets-Sheet 2

INVENTOR.
CLARENCE E. LOMAX

BY Wm. Walter Owen.

ATTORNEY

Patented July 18, 1950

2,515,783

UNITED STATES PATENT OFFICE 2,515,783

CONTROLLING CIRCUITS FOR ROTARY CONNECTOR SWITCHES

Clarence E. Lomax, Chicago, Ill., assignor to Automatic Electric Laboratories, Inc., Chicago, Ill., a corporation of Delaware Application July 22, 1947, Serial No. 762,620

11 Claims. (Cl. 179—18)

The present invention relates to automatic or semi-automatic telephone systems and more particularly concerns improvements in the circuits of switches known as rotary connectors. The rotary connector of this invention has access to groups of lines extending to private branch exchanges, and it may also have access to individual lines. When the usual directory number is dialed for calling a private branch exchange, the connector completes the call over the first idle line encountered in the group for the exchange. To obtain the night service feature which permits any line of a group to be tested in the same manner as an individual line, a special number is dialed.

An object of the invention is to prevent the loss of calls due to slow answering. Circuits in the connector switch control an alarm for notifying the maintainer at the telephone office that a call has not been answered promptly. Although the calling subscriber may abandon the call, the wipers of the connector still engage contacts of the seized line to indicate to the maintainer the line on which the delay occurred and to render the line busy to other connectors.

A feature of the invention is the means for rendering ineffective the function for automatically selecting an idle line of a group. When the wipers stop at a particular set of contacts that are common to one or more groups of lines, a relay operates for preventing automatic rotary motion. One more digit is dialed to advance the wipers to the desired line.

Another feature is an improved circuit arrangement for preventing automatic rotary motion when all lines of a group are busy.

Other features of the invention, attained by combining a stepping sequence switch of the type having cam discs with a Strowger switch, will become apparent from the complete description of the invention.

Figure 1:
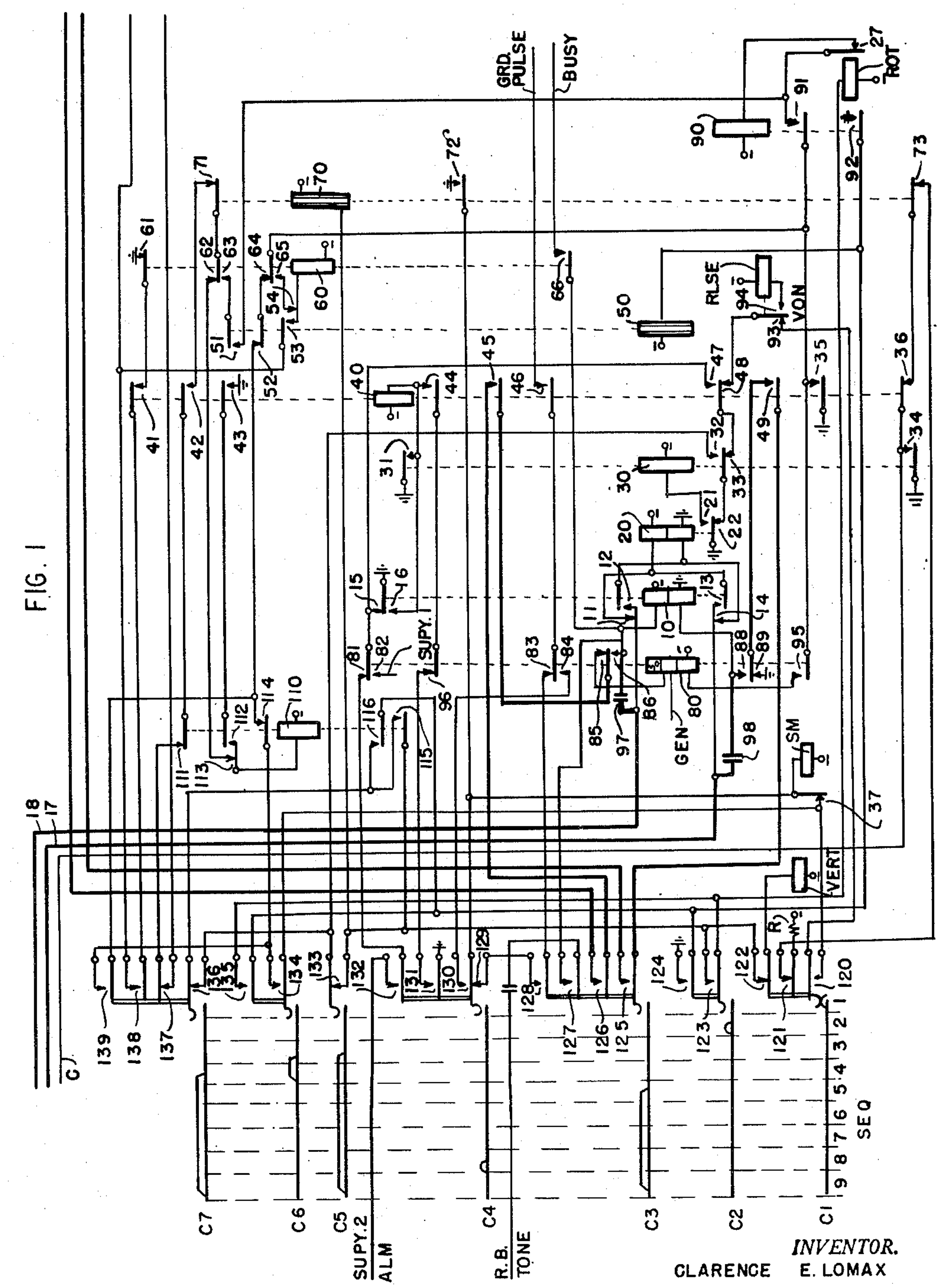
Figure 2:
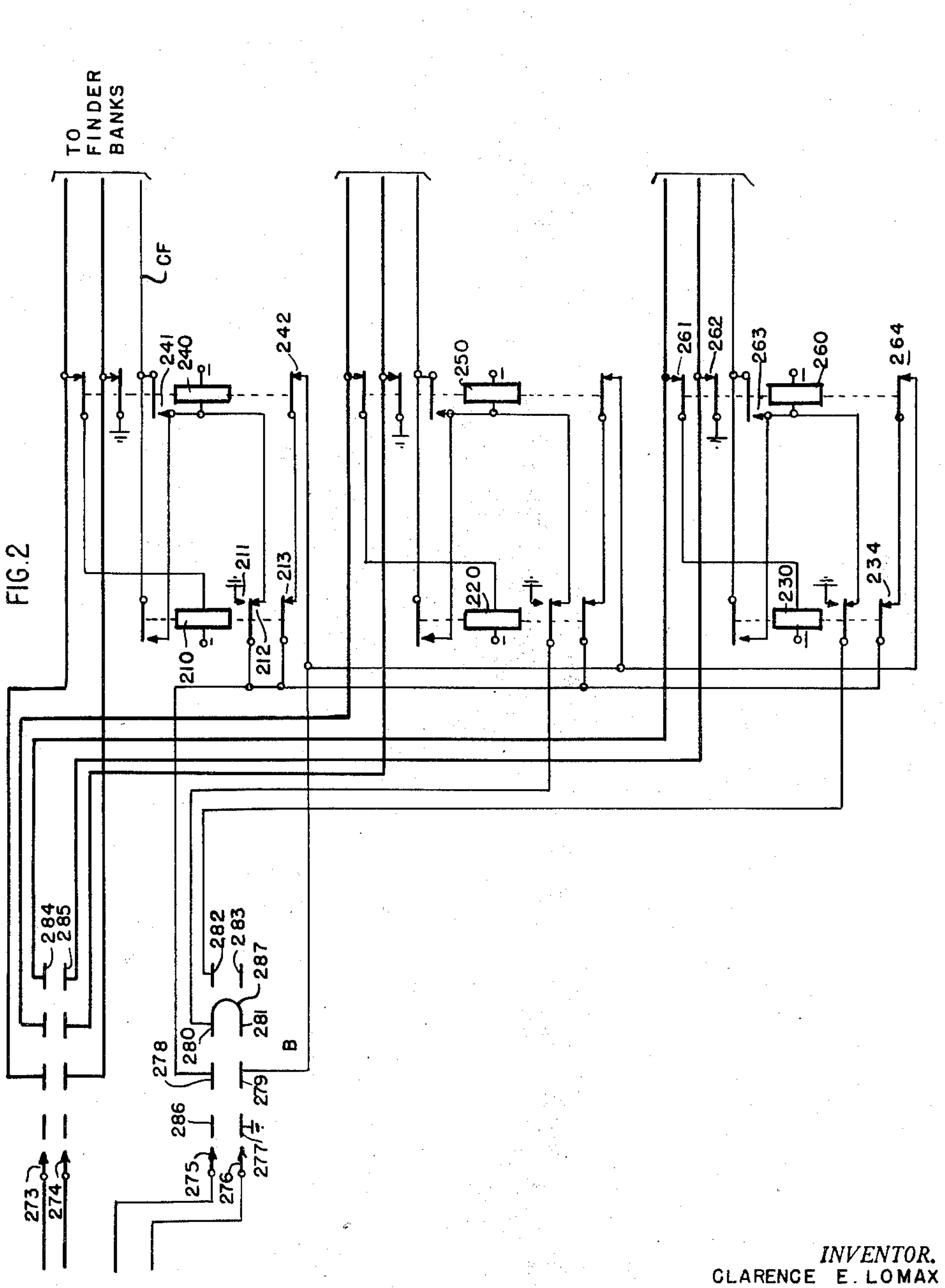

Figure 1 and Figure 2 together show a rotary connector and representative line equipment associated with the lines accessible at the connector banks. At the left in Figure 1 the sequence switch SEQ includes stepping magnet SM, and spring combinations actuated by cam discs C1 to C7 inclusive. The driving mechanism is so arranged that upon deenergization of magnet SM the seven cam discs are rotated to the next one of nine positions.

The well known Strowger switch includes the vertical stepping magnet at the lower left of Figure 1, the rotary stepping magnet at the lower right of Figure 1, the release magnet RLSE, the vertical off-normal springs VON, and in Figure 2 four wipers 273 to 276. Each wiper has access to ten levels of contacts, eleven contacts per level.

Four different ways of connecting the control and extra control contacts of each contact bank set are illustrated at B in Figure 2. At the first set of four contacts, the extra control contact 277 is connected permanently to ground potential; the control contact 286 and also the corresponding line contacts are not connected. When a calling subscriber causes the wipers to rotate to this set, the circuit for relay 110 in Figure 1 is completed at contact 277. Upon operating, relay 110 cancels the automatic rotary function and prepares circuits for advancing the wipers in response to the dialing of an additional digit. After relay 110 operates, automatic rotary is cancelled for any line appearing in that level of the switch regardless of the number of groups appearing therein. If the subscriber desires to make connection to an intermediate line of a group such as that connected to the third set of contacts, he dials the digit 2 for sending two more impulses to rotary stepping magnet. Should the line be busy, the busy tone is returned to the subscriber as if the subscriber had been connected to an individual line.

The second set of contacts at B are wired for the first line of a group. If the wipers are first operated to this set when this line is busy and any other line of the group is idle, control contact 278 and extra control contact 279 are at ground potential. When the wipers encounter ground on both control contacts, busy relay 60 operates over the circuit completed at wiper 275 and bank contacts 278 to transfer the circuit that includes the extra control wiper 276 from relay 110 to stepping relay 90. Shortly thereafter, relays 50 and 70 release to complete a circuit including contact 279 for relay 90. Relay 90 closes a circuit to energize the rotary magnet ROT for advancing the wipers to the next set. However, if all the lines of the group are busy, the extra control contact 279 is not at ground potential, because in each of the multiple circuits that connect contact 278 with contact 279, either the contacts corresponding to 234 of a line relay or 264 of a cut-off relay are open. Therefore, if there is not an idle line when the wipers reach the group, the wipers remain on the first line while the connector returns a busy signal to the calling subscriber. Contacts 213 of line relay 210 and contacts 242 of cut-off relay 240 are not required for operation of the circuit as described but are shown to make the relays of the first line of the group similar to the relays of the other lines. Uniformity facilitates wiring and maintenance.

The circuits for an intermediate trunk line of a group are shown at the third set of contacts. Control contacts 280 and extra control contacts 281 are connected by a link 287. When this line tests busy after the wipers are stepped to this set from the second set of contacts, both contacts are at ground potential, and the wipers are advanced to the next set.

The last line of the group, or an individual line, is connected as indicated at the fourth set of contacts. If the lines that were idle when the connector reached the group become busy while the connector is searching, the wipers will stop at the last line. The circuit for stepping relay 90 is open at the extra control contact 283 and the circuit of the busy relay is complete to ground at the control contacts 282.

The sequence switch SEQ controls circuits required for operating the Strowger switch, prepares line circuits, and in response to ground pulses which occur at fixed intervals sounds an alarm to indicate to a maintainer that a call has not been answered within a determined interval after the ringing current has been connected. Relay 70 deenergizes at the completion of each series of impulses dialed by a calling subscriber to advance the cam discs to the next position. In position 1 a circuit is prepared for the vertical stepping magnet VERT; in position 2 a circuit is prepared for the rotary stepping magnet ROT; in position 3, if a special number for night service has been dialed, another circuit is prepared for the rotary stepping magnet, or for usual service a self-interrupting circuit of magnet SM is prepared for advancing the cams; in position 4 ground potential is placed on the control conductor for operating the cut-off relay in the line circuits of the called subscriber; in position 5 the called subscriber's line is connected to the ringing generator, and a circuit is completed for energizing the sequence magnet SM at fixed intervals; positions 6 and 7 are for timing; in position 8 the circuit for advancing the cams is opened, and a circuit is completed to an alarm for notifying a maintainer that answering has been delayed. If a call is completed after the cams reach position 8, a circuit of the alarm is opened, and a circuit is closed for advancing the cams to position 9. The cams return to position 1 after the Strowger switch has been released.

A complete understanding of the invention may be had from the detailed description now given. The subscriber's sub-station and the automatic switches preceding the connector may be the well known type associated with automatic Strowger switches. When the connector is idle, negative potential is extended to control contacts in the banks of the preceding selectors over the following circuit: negative battery, resistor R at the lower left of Figure 1, contacts 121, contacts 73, contacts 36, and control conductor C to the bank contacts.

When a preceding switch seizes the connector of Figure 1, pulsing relay 20 operates over the following circuit: ground, lower winding of relay 20, contacts 14, line 17, through the preceding switches and the subscriber's telephone, line 18, contacts 11, upper winding of relay 20, and negative battery. At contacts 21 the circuit is completed from ground, through the winding of slow release relay 30 to negative battery. Relay 30 operates, at contacts 34 returns ground over conductor C to the preceding switch, at contacts 32 prepares the pulsing circuit for the vertical magnet, and at contacts 31 closes the circuit for slave relay 40. Relay 40 operates. At contacts 41 a circuit is prepared for grounding control wiper 275; at contacts 42 a circuit is prepared for relay 110 which at times prevents automatic trunk hunting; at contacts 43 a locking circuit is prepared for relay 110; at contacts 44 a circuit is prepared for maintaining relay 40 energized after the loss of a call due to slow answering; at contacts 45 a circuit is prepared for ring cut-off relay 80; at contacts 46 a circuit is prepared for extending pulses of ground potential to the stepping magnet of the sequence switch; at contacts 47 and 48 an incomplete ground circuit is transferred from the release magnet to an alarm conductor SUPY. 2; at contacts 49 a circuit is prepared for grounding one side of the called subscriber's line during ringing; at contacts 35 a locking ground circuit is prepared; and at contacts 36 negative battery is disconnected from the incoming control conductor C.

When the calling subscriber dials a digit following the seizure of the connector, pulsing relay 20 responds to the series of interruptions to cause vertical stepping. The pulsing circuit controlled by relay 20 may be traced as follows: ground, contacts 22, contacts 32, contacts 133, contacts 122, winding of vertical magnet VERT, and negative battery. Slow releasing relay 70 is operated on the first pulse over the circuit including ground, contacts 22, contacts 33, contacts 133, winding of relay 70, and negative battery. At contacts 71 a point is opened in the connection to the extra control conductor EC; at contacts 73 an additional point is opened in the control circuit C; and at contacts 72 the circuit including ground, contacts 72, winding of sequence stepping magnet SM, and negative battery, is closed to energize the magnet. The shaft and wipers 273 to 276 inclusive are raised to the level corresponding to the digit dialed. In response to the first vertical step the vertical off-normal spring VON is actuated to transfer an incomplete circuit from the magnet SM to the release magnet RLSE. Shortly after the completion of the series of impulses relay 70 releases to open the energizing circuit of stepping magnet SM.

Upon releasing SM causes the cams of the sequence switch SEQ to step to position 2. Cam C1 at contacts 120 prepares a homing circuit for the sequence switch, at contacts 121 opens a further point in the control circuit C, and at contacts 122 opens the circuit of the vertical stepping magnet VERT. Cam C2 at contacts 123 connects the rotary magnet to the pulsing circuit and at contacts 124 closes the circuit including ground, contacts 124, winding of slow-releasing relay 50, and negative battery. Relay 50 operates. At contacts 51 a control circuit for automatic rotary is prepared; at contacts 52 a point is opened in an incomplete circuit to the sequence stepping magnet; and at contacts 53 a circuit is prepared for busy relay 60.

The next digit that is dialed is the final digit except when the night service feature is to be effective. Relay 20 pulses to operate relay 70 again and to rotate wipers 273 to 276 inclusive to the desired contact in the switch bank. The circuit for energizing the rotary stepping magnet includes ground, contacts 22, contacts 32, contacts 133, contacts 123, winding of the rotary magnet ROT and negative battery.

If the wipers engage line and control contacts corresponding to the first line of a group in which the first line is busy, but in which one or more lines are idle, the wipers 275 and 276 will encounter ground potential on contact 278 and contact 279 respectively. The busy relay 60 operates over the following circuit: ground on conductor CF, contacts 241, contacts 212, contact 278, wiper 275, contacts 53, winding of relay 60, and negative battery. At contacts 61, ground is disconnected from the incomplete circuit to test wiper 275; at contacts 62 a point is opened in an incomplete circuit of relay 110; at contacts 63 a circuit is prepared for stepping relay 90; at contacts 64 an additional point is opened in a circuit to the sequence stepping magnet; at contacts 65 a locking circuit is prepared; and at contacts 66 busy signal is connected through condenser 97 to the calling subscriber's line. Although the busy signal is connected to the calling subscriber's line when the first line of a group tests busy, the connector will quickly select automatically an idle line if it is available within the group, and relay 60 will immediately release to disconnect the busy signal before the calling subscriber recognizes it. Shortly after the completion of dialing, relay 70 releases to open the circuit of the sequence switch magnet at contacts 72 and to close the circuit of stepping relay 90 at contacts 71. Upon deenergizing the sequence switch magnet SM advances the cams to position 3. Cam C2 at contacts 123 disconnects the rotary magnet from the pulsing circuit controlled by relay 20, and at contacts 124 opens the circuit of slow-releasing relay 50. Cam C5 at contacts 133 disconnects relay 70 from the pulsing circuit. Cam C6 at contacts 134 prepares a circuit for operating the stepping magnet of the sequence switch, and at contacts 135 prepares a circuit for the rotary magnet. The operating circuit for relay 90 may be traced from the ground for busying control contact 278 through contacts such as 234 and 264 associated with an idle line, extra control contact 279, wiper 276, contacts 137, contacts 111, contacts 42, contacts 71, contacts 63, contacts 51, interrupter springs 27, and winding of relay 90 to negative battery. Relay 90 at contacts 91 closes its inter-locking circuit including ground, contacts 35, contacts 91, interrupter springs 27, winding of relay 90 and negative battery, at contacts 92 closes an obvious circuit to maintain slow releasing relay 50 operated, and also at contacts 92 closes the following circuit for energizing the rotary magnet ROT: ground, contacts 92, contacts 135, winding of rotary magnet, and negative battery.

Upon operating the rotary magnet advances the wipers to the bank contacts of the next line of the group, and at interrupter contacts 27 opens the circuit of stepping relay 90 which then releases to open the circuit of the rotary magnet at contacts 92. If this line is busy stepping relay 90 will operate again over the previously traced circuit which extends from the ground potential at the extra control contact. The alternate operation of stepping relay 90 and of rotary magnet ROT continues, if all the intermediate lines are busy, until the last line of the group is reached.

The last line of the group and also the individual lines do not have their test contacts connected by links such as 287. Since the circuit of relay 90 is open at contact 283 of the last line of the group, the operating circuit of relay 50 and rotary magnet ROT remains open at contacts 92. Relay 50 releases. At contacts 52 a locking circuit for busy relay 60 is completed from ground, contacts 35, contacts 65, contacts 54, and winding of relay 60 to negative battery, and at contacts 51 the circuit of relay 90 is opened at an additional point. Upon recognizing the busy signal that was connected to the line at contacts 66 of busy relay 60, the calling subscriber replaces his receiver upon the switch hook whereupon relay 20 deenergizes and opens the circuit of slow release relay 30 at contacts 21. Relay 30 at contacts 31 opens the circuit of relay 40, at contacts 34 removes the ground from control conductor C to release the preceding switches, and at contacts 33 prepares a circuit for the release magnet. Upon releasing relay 40 at contacts 35 opens the circuit for restoring busy relay 60, and at contacts 48 closes the following circuit of the release magnet: ground, contacts 22, contacts 33, contacts 48, contacts 94, release magnet RLSE, and negative battery. The shaft and wipers 273 to 276 inclusive are restored to normal and the off-normal spring VON is actuated to open the circuit of the release magnet and to close the following circuit for homing the cams of sequence switch SEQ: ground, contacts 22, contacts 33, contacts 48, contacts 93, contacts 120, interrupter contacts 37, stepping magnet SM, and negative battery. The magnet SM interrupts its own circuit repeatedly at contacts 37 to advance the cams from position 3 to normal position 1. Cam C1 at contacts 120 disconnects ground from the interrupter springs, and at contacts 121 makes the switch ready for another call by connecting negative potential through resistor R, contacts 121, contacts 73, and contacts 36 to control conductor C.

If the last line of the group is idle as wipers 273 to 276 inclusive engage the bank contacts corresponding to this line, wiper 275 does not encounter ground on contact 282 for completing the circuit of busy relay 60 and it releases. At contacts 61 a circuit is prepared for placing ground on wiper 275; and at contacts 64 a circuit is prepared for energizing the sequence magnet SM. As in the previous description for a busy condition relay 50 releases shortly after the completion of rotary motion, but now at contacts 52 the following circuit is closed to energize magnet SM: ground, contacts 35, contacts 64, contacts 52, contacts 114, contacts 134, contacts 37 of the interrupter springs, magnet SM, and negative battery. Upon operating, the magnet interrupts its circuit and then releases to advance the cams to position 4. Cam C7 at contacts 136 and 139 prepares circuits required when the night service feature is used, at contacts 137 opens a point in the extra control circuit, and at contacts 138 places ground on wiper 275 for operating the cut-off relay 260 in the subscriber's line equipment. The cams of the sequence switch continue to position 5. Cam C6 at contacts 134 opens the operating circuit of magnet SM, and at contacts 135 opens an additional point in the circuit of the rotary magnet. Cam C3 at contacts 125 and 126 connects interrupted ringing current from the ringing machine GEN to the wanted subscriber's lines, at contacts 127 completes the circuit for returning ring-back-tone to the calling subscriber, and at contacts 128 closes a circuit for advancing the cams of the sequence switch at fixed intervals. The circuit for periodically energizing the sequence switch magnet includes ground, an interrupter (not shown) which may be controlled by the ringing generator or a timing device, lead marked GRD. PULSE, contacts 46, contacts 83, contacts 128, contacts 129, winding of magnet SM, and negative battery.

If the called subscriber does not answer immediately the cams continue to position 8, and cams C4 at contacts 129 opens the operating circuit of magnet SM, at contacts 130 prepares another circuit for magnet SM, at contacts 131 completes a locking circuit for relay 40, and at contacts 132 completes the following circuit to sound an alarm for notifying a maintainer: ground, contacts 15, contacts 81, contacts 132, and to alarm equipment.

After the alarm sounds, should the calling subscriber hang up before the call is answered, the connector still remains in the ringing position until a maintainer finds the fault, or a called subscriber or an operator at the private branch exchange answers. When the subscriber hangs up, relay 20 releases and opens the circuit of slow releasing relay 30 at contacts 21. Relay 30 at contacts 31 opens the initial operating circuit of relay 40, and at contacts 34 removes ground from control conductor C to release the preceding switches. The circuit which ordinarily releases the connector is open at contact 48 of relay 40; relay 40 is maintained operated by the locking circuit including ground, contacts 131, contacts 96, contacts 44, winding of relay 40, and negative battery.

If the called subscriber or operator answers in response to the ringing which continues after the calling subscriber has hung up, the following circuit is completed for operating the ring-cut-off relay 80: negative battery at ringing generator GEN, upper winding of relay 80, contacts 85, contacts 45, contacts 126, wiper 273, over the subscriber's loop to wiper 274, contacts 125, contacts 49, contacts 89, and ground. Relay 80 at contacts 96 opens the locking circuit of relay 40. The circuit for releasing the connector is completed at contacts 48, and the connector restores to normal in the manner previously described.

Should the called subscriber or operator answer when the cams of the sequence switch are in position 8 and the calling subscriber is still waiting for an answer, the circuit as previously traced is completed for operating ring-cut-off relay 80. Relay 80 at contacts 81 opens the circuit to stop the alarm due to delayed answer, at contacts 82 prepares a circuit for supervision, at contacts 96 opens the locking circuit of relay 40 to transfer control of the release magnet back to the calling subscriber, at contacts 84 closes a circuit to the sequence switch magnet, at contacts 85 and 89 disconnects the called subscriber's lines from the circuit of the ring-cut-off relay, at contacts 86 and 88 connects the lines to the back-bridge relay 10 and also to the calling subscriber's lines through condensers 97 and 98, and at contacts 95 completes its locking circuit through contacts 35 controlled by relay 40. The circuit for energizing the sequence magnet may be traced from the lead marked GRD. PULSE, contacts 46, contacts 84, contacts 130, and winding of sequence magnet SM to negative battery. Upon advancing to position 9, cam C4 at contacts 130 opens a point in the operating circuit of magnet SM. The circuit for operating back bridge relay 10 includes ground, lower winding of relay 10, contacts 88, contacts 49, contacts 125, wiper 274, the subscriber's loop to wipers 273, contacts 126, contacts 45, contacts 86, upper winding of relay 10, and negative battery. At armatures 12 and 13 the current flow is reversed to the calling subscriber's lines. When the conversation is completed and the calling subscriber hangs up, the connector is released as previously described.

Normally, the called subscriber or operator answers before an alarm sounds. When ring-cut-off relay 80 operates in response to answering before the cams reach position 8, the circuit of the sequence switch magnet SM is opened at contacts 83 to stop the cams.

When the night service feature is employed, the connector responds to an additional digit. In response to the first digit that is dialed as usual after the connector is seized, the wipers 273 to 276 are raised to the desired level and the cams C1 to C7 inclusive are advanced to position 2 in the manner previously described. A particular digit such as digit 1 is then dialed to cause relay 110 to operate. In response to the single impulse corresponding to digit 1 the rotary magnet is operated over the previously traced circuit from ground, contacts 22, contacts 32, contacts 133, contacts 123, and winding of magnet ROT to negative battery; relay 70 operates over the circuit including ground, contacts 22, contacts 32, contacts 133, winding of relay 70, and negative battery. The wipers are rotated to the contacts in the first position of the banks. The contacts engaged by wipers 273, 274, and 275 are not connected; but EC contact 277 engaged by wiper 276 is connected permanently to ground. Shortly after the impulse, relay 70 releases, at contacts 71 closes the circuit for operating relay 110, and at contacts 72 opens the circuit of magnet SM. At contacts 112 a locking circuit is completed from ground, contacts 43, contacts 112, and winding of relay 110 to negative battery; at contacts 113 the operating circuit of relay 110 is opened; at contacts 116 pulsing circuits are prepared for relay 50 and the rotary magnet; at contacts 115 a circuit is prepared for relay 70; and at contacts 111 the operating circuit of stepping relay 90 is opened to prevent automatic rotary when a subsequently tested called line tests busy. When the magnet SM releases, the cams of the sequence switch are advanced to position 3. Cam C5 opens contacts 133, but the circuit is still prepared to relay 70 through contacts 136 and contacts 115. Cam C6 at contacts 135 connects the rotary magnet to the pulsing circuit.

After the automatic rotary has been rendered ineffective, the final digit is dialed for connecting the wipers to the desired line. The number of impulses to be sent is one less than the total number of rotary steps required to engage the desired contacts. The ordinary dial that sends a maximum of ten impulses in a series can be used to rotate the wipers to a line connected to the eleventh set of contacts in the bank. The circuit for the rotary magnet may be traced from ground, contacts 22, contacts 32, contacts 136, contacts 116, contacts 135, and winding of rotary magnet ROT to the negative battery. The following circuit is completed for operating slow releasing relay 50: ground, contacts 22, contacts 32, contacts 136, contacts 116, relay 50, and negative battery. Relay 70 is operated over the circuit including contacts 22, contacts 32, contacts 136, contacts 115, and relay 70. At contacts 72 the circuit is completed for energizing magnet SM.

If the line is busy, relay 60 operates to return busy signal. When the calling subscriber hangs up, the connector releases as described for busy condition on the last line of a group.

When the line is idle, relay 60 is not operated as relay 50 and relay 70 release. Magnet SM releases to advance the cams of the sequence switch to position 4. Cam C7 at contacts 136 opens a point in the pulsing circuit, at contacts 138 connects ground potential to wiper 275 to operate the called subscriber's cut-off relay, and at contacts 139 closes a circuit for advancing the cams to position 5. The circuit for advancing the cams includes ground, contacts 35, contacts 64, contacts 52, contacts 139, contacts 134, interrupter springs 37, magnet SM, and negative battery. Cam C6 at contacts 135 disconnects the rotary magnet from the pulsing circuit, and at contacts 134 opens the circuit to the interrupter springs of the sequence magnet. Cam C3 at contacts 128 connects the sequence magnet SM to the interrupter supplying timed ground pulses, at contacts 127 connects ring-back-tone to the calling subscriber's lines, and at contacts 125 and 126 connects the called subscriber's line to the ringing circuit. The connection is completed as previously described. After the conversation is over, the switch releases in the usual manner. Relay 110 is released when its locking circuit is opened at contacts 43 of relay 40.

Although the present invention has been embodied in a specific structure, extensive departures in the embodiment may be made without departing from the scope and spirit of the invention.

What is claimed is:

1. In a telephone system, a calling line, a called line, a sequence switch, means under the control of said calling line for connecting said switch to said called line, means for operating said switch to connect a ringing generator to said called line, means for advancing said switch at a predetermined rate to measure an interval of time after the connection of ringing generator to said called line, an alarm circuit, and means in said switch at the end of said time interval for closing said alarm circuit.

2. In a telephone system, calling and called lines, an automatic two motion connector switch controlled from a calling subscriber to step in both of its motions to a position corresponding to a called line, a source of signalling current, a cam controlled sequence switch operated one step at a time throughout the movements of the connector switch to control both movements thereof and to connect said source of signalling current to the called line after the position is reached, and means for thereafter operating said sequence switch as a timing switch, an alarm signal, said sequence switch being effective to control said alarm signal after a predetermined time to indicate an unanswered call.

3. In a telephone system, a calling line, a called line, a connector having access to said called line, means controlled from said calling line for operating said connector to engage said called line, means for applying ringing current to said called line and for measuring a predetermined time, a restoring means under the control of said calling line prior to the completion of said predetermined time for restoring said connector, means effective at the end of said predetermined time to sound an alarm and to render said restoring means independent of control from said calling line, and means effective thereafter for controlling said restoring means from said called line.

4. In a telephone system, a calling line, a called line, a connector, a timing device, means simultaneously effective for operating said connector to engage said called line and for starting said timing device to measure a predetermined time, a restoring means, means under the control of said calling line for operating said restoring means to restore said connector, means effective at the end of said predetermined time for removing control of said restoring means from said calling line, and means under the control of said called line for returning control of said restoring means to said calling line.

5. In a telephone system, a called line, a calling line, a connector having wipers accessible to contacts of said called line, means under the control of said calling line for engaging said wipers with said contacts, means for applying ringing current to said called line and for measuring a predetermined time, a restoring means, means under the control of said calling line for operating said restoring means prior to the completion of said predetermined time, means effective at the end of said predetermined time if the restoring means has not operated to render said restoring means independent of control from said calling line and to sound an alarm, and means thereafter under the control of said called line for operating said restoring means to restore said wipers.

6. In a telephone system, a group of lines, a connector having access to said group of lines, means directively controlled from a calling line for operating said connector to select an idle line of said group, means effective in case the connector engages a busy line for operating said connector automatically to select an idle remaining line in said group, a night contact assigned to said group of lines, means operative in case the connector has been operated to select said night contact for preventing automatic operation of said connector to select an idle line, and means in said connector responsive to a subsequent digit for operating said connector from said night contact to a position corresponding to another line of said group regardless of its idle or busy condition.

7. In a telephone system, a connector, a plurality of groups of lines and a control circuit connection accessible to said connector, a calling line, means directively controlled from said calling line for operating said connector to select any one of said lines or to select said control circuit connection, means operative in the first instance if a busy one of said lines of a group is encountered for operating said connector to find an idle remaining line in the group, means operated when the control circuit is selected for preventing the automatic operation of said connector during the subsequent selection of a line in any of said groups, and means directively controlled from said calling line for operating said connector to select any one of said lines regardless of its idle or busy condition.

8. In a telephone system, calling and called lines, a connector switch controlled from a calling line to connect with and test said called lines, certain of said called lines arranged in groups in the bank of said switch, said connector switch operated in response to a single digit dialed by a calling subscriber to move to a position corresponding to the first line of a group and if that line is busy to step to the positions of other lines of the group until an idle one is found, another bank position in the switch common to the group of lines, and means effective when the switch is operated to said other position for preventing further automatic operation of the switch but permitting directive operation thereof in response to a second digit dialed by the calling subscriber to seize and test any particular one of the lines of the group whether busy or idle and to return a busy signal in case the particular line selected is busy.

9. In a telephone system, an automatic switch, a control wiper and an extra control wiper therefor, sets of contacts accessible to said wipers, a busy relay, a stepping relay, means for operating said switch to engage one of said sets of contacts, a circuit including said control wiper for operating said busy relay in case said control wiper encounters a ground potential on the contact engaged thereby, a circuit completed by the operation of said busy relay to connect said stepping relay to said extra control wiper, said circuit of the stepping relay effective in case said extra control wiper encounters ground potential on the contact engaged thereby for operating said stepping relay, means controlled by said stepping relay for stepping said wipers, a third relay, a circuit for said third relay including said extra control wiper, said circuit of the third relay effective in case said extra control wiper alone encounters a ground potential on a contact of one of said sets for operating said third relay, and contacts included in said circuit of the stepping relay opened in response to the operation of said third relay.

10. In a telephone system, a group of lines, a set of contacts for each line, each set including a control contact and an extra control contact, an automatic switch having access to said sets, a line relay and a cut-off relay for each of said lines, means for connecting a busy potential to the control contact of the first line in said group, multiple circuits including contacts on said line relays and on said cut-off relays for connecting said busy potential to the extra control contact of said first line, means for operating said switch to select the set of contacts of said first line, means responsive to the finding of busy potential on both the control contact and extra control contact for operating said switch to test other ones of said lines, and means effective if all the lines of said group are busy for operating the line relay or the cut-off relay of each of said lines, said operated relays removing said busy potential from the extra control contact of said first line to prevent said switch from testing other busy lines.

11. In a telephone system, a group of lines, a control contact and an extra control contact for the first line of said group, an automatic switch having access to said lines, means for connecting a busy potential to said control contact, a line relay and a cut-off relay for each of said lines, multiple circuits controlled by said relays except the line relay and cut-off relay of the first line of said group, said multiple circuits connecting said busy potential to said extra control contacts, means for operating said switch to select said first line, means responsive to encountering said busy potential on both of said contacts for operating said switch to test other ones of said lines, and means effective if all of said lines are busy for operating the line relay or the cut-off relay of each of said lines, said operated relays of said lines except said first line removing said busy potential from said extra control contacts to prevent said switch from testing other lines of said group.

CLARENCE E. LOMAX.

REFERENCES CITED

The following references are of record in the file of this patent:

UNITED STATES PATENTS

| Number | Name | Date |
|---|---|---|
| 1,293,195 | Quass | Feb. 4, 1919 |
| 1,349,381 | Jacobsen | Aug. 10, 1920 |
| 1,655,061 | Jordan | Jan. 3, 1928 |
| 1,689,213 | Scheunert | Oct. 30, 1928 |
| 1,693,124 | Stehlik | Nov. 27, 1928 |
| 1,708,244 | Taylor | Apr. 9, 1929 |
| 1,716,986 | Stehlik | June 11, 1929 |
| 1,856,832 | Halverson | May 3, 1932 |
| 1,925,681 | Uda | Sept. 5, 1933 |
| 2,052,050 | Levy | Aug. 25, 1936 |
| 2,143,971 | Brazelton | Jan. 17, 1939 |
| 2,335,481 | Boswau | Nov. 30, 1943 |